United States Patent
Ouyang

(10) Patent No.: US 10,937,238 B2
(45) Date of Patent: Mar. 2, 2021

(54) IMAGE PROCESSING METHOD AND DEVICE

(71) Applicant: BEIJING KEEYOO TECHNOLOGIES CO., LTD., Beijing (CN)

(72) Inventor: Congxing Ouyang, Beijing (CN)

(73) Assignee: Beijing Keeyoo Technologies Co., LTD., Beijing (CN)

(*) Notice: Subject to any disclaimer, the term of this patent is extended or adjusted under 35 U.S.C. 154(b) by 0 days.

(21) Appl. No.: 16/641,066

(22) PCT Filed: Aug. 2, 2018

(86) PCT No.: PCT/CN2018/098388
§ 371 (c)(1),
(2) Date: Feb. 21, 2020

(87) PCT Pub. No.: WO2019/037582
PCT Pub. Date: Feb. 28, 2019

(65) Prior Publication Data
US 2020/0184723 A1 Jun. 11, 2020

(30) Foreign Application Priority Data
Aug. 25, 2017 (CN) .......................... 201710744863.3

(51) Int. Cl.
G06T 19/00 (2011.01)
G06T 7/73 (2017.01)
G06K 9/62 (2006.01)

(52) U.S. Cl.
CPC ............ *G06T 19/00* (2013.01); *G06K 9/6201* (2013.01); *G06T 7/74* (2017.01); *G06T 2207/10068* (2013.01); *G06T 2207/30036* (2013.01)

(58) Field of Classification Search
None
See application file for complete search history.

(56) References Cited

U.S. PATENT DOCUMENTS

2006/0189842 A1* 8/2006 Hoeg ................... A61B 1/0005
600/118
2008/0273773 A1 11/2008 Ernst et al.
(Continued)

FOREIGN PATENT DOCUMENTS

| CN | 10666327 A | 5/2017 |
| CN | 107644454 A | 1/2018 |
| WO | 2014100950 A1 | 7/2014 |

OTHER PUBLICATIONS

International Search report for PCT/CN2018098388 dated Nov. 2, 2018.
Translation of CN107644454A.

Primary Examiner — Frank S Chen
(74) Attorney, Agent, or Firm — Emerson Thomson Bennett LLC; Daniel A. Thomson

(57) ABSTRACT

An image processing method and an image processing device includes: receiving image data of a user transmitted by an endoscope, storing and splicing to obtain spliced image data; determining the block corresponding to the spliced image data, determine the position of the block in the stored three-dimensional image contour of the user, reconstructing the spliced image data at the corresponding determined position in the three-dimensional image contour of the user to obtain reconstructed three-dimensional image data and update the currently stored three-dimensional image model of the user, according to the stored three-dimensional image frame database; and displaying the updated three-dimensional image model of the user. The three-dimensional image of the oral cavity can be reconstructed without continuous and orderly scanning of the oral (Continued)

Fig. 1 cavity, the dynamic display can be performed, the user interaction effect can be improved, and the self-service three-dimensional true color model selection can be supported.

20 Claims, 4 Drawing Sheets

(56) References Cited

U.S. PATENT DOCUMENTS

| | | | | |
|---|---|---|---|---|
| 2009/0087050 | A1* | 4/2009 | Gandyra | G01C 11/02 |
| | | | | 382/128 |
| 2010/0128109 | A1* | 5/2010 | Banks | H04N 13/204 |
| | | | | 348/46 |
| 2017/0270709 | A1* | 9/2017 | Tran | A43B 13/04 |
| 2017/0352161 | A1* | 12/2017 | Ganapati | H04N 13/207 |

* cited by examiner

IMAGE PROCESSING METHOD AND DEVICE

CROSS-REFERENCE TO RELATED APPLICATION

This application claims priority to Chinese Patent Application No. 201710744863.3, filed on Aug. 25, 2017, entitled: "image processing method and device" the entire contents of which are herein is incorporated by reference.

TECHNICAL FIELD

The invention relates to the technical field of image processing, in particular to an image processing method and device.

DESCRIPTION OF THE RELATED ART

The traditional oral endoscope is a kind of equipment used for dental optical impression-taking. When in use, the optical gun head used for impression-taking needs to be moved orderly in the upper dentition and lower dentition of a user. However, the scanning gun head is not supported to roam freely in the oral cavity, and is highly professional, has poor user interaction effect, and requires professionals to be operated.

At present, there is also a user self-service oral endoscope, which the user holds, puts a camera part into the oral cavity, and rotates the camera part to perform endoscopy on the oral cavity. However, endoscopic images can only show a very small part at a time. Although the images of teeth can also be seen, it is difficult to confirm which tooth this is and which specific position of the oral cavity the currently seen details are in. In addition, there is a lack of three-dimensional image information, which makes it impossible to mold the full dentition, to generate the current digital model of the full dentition in real time, and thus to support dental applications such as three-dimensional printing of the dental shell type dentifrice.

SUMMARY

Embodiments of the present invention provides an image processing method and an image processing device, which are used for solving the problems of poor user interaction effect and difficulty in supporting self-service three-dimensional true color modeling of users in oral cavity image presentation in the prior art.

The specific technical scheme provided by the embodiment of the invention is as follows.

An image processing method includes:

Step A: receiving image data of a user transmitted by an endoscope, wherein the image data includes at least the image data captured by an imaging unit in the endoscope, and the type of the image data is a depth image;

Step B: storing the received image data, and respectively judging whether the stored image data can be spliced with each other, and splicing the stored image data to obtain spliced image data when it is determined that the spliced image data can be spliced;

Step C: determining a block corresponding to the spliced image data according to the stored three-dimensional image frame database, and determining the position of the block in the stored three-dimensional image contour of the user, and reconstructing the spliced image data at a corresponding determined position in the three-dimensional image contour of the user to obtain reconstructed three-dimensional image data, wherein the three-dimensional image frame database stores image data of blocks dividing the three-dimensional image frame image and position information of images of each block;

Step D: updating the currently stored three-dimensional image model of the user according to the reconstructed three-dimensional image data, wherein the initial value of the three-dimensional image model of the user is the three-dimensional image contour of the user; and Step E: displaying the updated three-dimensional image model of the user.

Preferably, the image data of the blocks includes number information and image characteristic information.

The position information of the image of the blocks includes: the spatial position relationship between each block.

The image of each block in the three-dimensional image contour is a three-dimensional curved surface shape based on the image of the block in the three-dimensional image frame database or the three-dimensional image model of the user, and includes a preset image with a single color and a single texture.

Preferably, the step of determining a block corresponding to the spliced image data according to the stored three-dimensional image frame database, and determining the position of the block in the stored three-dimensional image contour of the user specifically includes:

respectively matching the spliced image data with images of blocks in the three-dimensional image frame database according to a preset image pattern recognition algorithm and based on image characteristic information of blocks in the three-dimensional image frame database, to obtain a first mapping relationship between the spliced image data and blocks in the three-dimensional image frame database; and determining the positions of the blocks in the three-dimensional image frame database corresponding to the spliced image data in the three-dimensional image contour of the user according to the spatial position relationship and/or number information between the blocks.

Preferably, the step of determining a block corresponding to the spliced image data according to the stored three-dimensional image frame database, and determining the position of the block in the stored three-dimensional image contour of the user specifically includes:

respectively determining the relative spatial position relationship of the spliced image data according to the relative spatial position relationship of each imaging unit in the endoscope and the identification of the camera units carried in the image data, if the endoscope comprises at least two preset camera units with fixed relative positions;

respectively matching the spliced image data with the images of the blocks in the three-dimensional image frame database to obtain a first mapping relationship between the spliced image data and the blocks in the three-dimensional image frame database, according to a preset image pattern recognition algorithm and based on the image characteristic information of the blocks in the three-dimensional image frame database and the relative spatial position relationship of the spliced image data; and determining the positions of the blocks in the three-dimensional image frame database corresponding to the spliced image data in the three-dimensional image contour of the user according to the spatial position relationship and/or number information between the blocks.

Preferably, when matching the spliced image data with the images of blocks in the three-dimensional image frame database respectively, the method further includes:

obtaining the first mapping relationship between the spliced image data and the blocks in the three-dimensional image frame database according to the spatial position relationship between the blocks preset in the three-dimensional image frame database, when it is determined that the spliced image data corresponds to at least two blocks.

Preferably, the method further includes:

selecting a first preset number of first mapping relationships from the at least two groups of first mapping relationships according to the confidence level of each group of first mapping relationships, if at least two groups of first mapping relationships are obtained, and using the selected first preset number of first mapping relationships in calculating the first mapping relationships when the user's image data transmitted by the endoscopic tool is received next time, so that for the next received image data, each mapping relationship based on the selected first preset number of first mapping relationships is respectively obtained until obtaining the maximum number of first mapping relationships not greater than the second preset number, and the superposition confidence of each group of first mapping relationships in the second preset number of first mapping relationships is judged, respectively; and taking the first mapping relationships of any one group as the second mapping relationship between spliced image data and blocks in the three-dimensional image frame database, if it is determined that the superposition confidence of any one group of mapping relationships in the second preset number of first mapping relationships is not less than a preset threshold value.

Preferably, the step of reconstructing the spliced image data at a corresponding determined position in the three-dimensional image contour of the user to obtain reconstructed three-dimensional image data specifically includes:

extracting three-dimensional curved surface images belonging to corresponding blocks from the spliced image data according to boundary characteristic information of blocks in the three-dimensional image frame database, wherein the image characteristic information at least comprises boundary characteristic information of a block; and replacing the image at the corresponding determined position in the three-dimensional image contour of the user with the extracted three-dimensional curved surface image to obtain reconstructed three-dimensional image data.

Preferably, the step of updating the currently stored three-dimensional image model of the user according to the reconstructed three-dimensional image data includes:

replacing the image at the corresponding determined position in the currently stored three-dimensional image model of the user with the reconstructed three-dimensional image data;

and the method further includes:

acquiring a three-dimensional image contour corresponding to the updated three-dimensional image model of the user according to the updated three-dimensional image model of the user, and updating the stored three-dimensional image contour of the user according to the three-dimensional image contour corresponding to the updated three-dimensional image model of the user.

Preferably, the method further includes:

returning to performing the Step B, when the image data of the user transmitted by the endoscope is received again.

Preferably, after displaying the updated three-dimensional image model of the user, the method further includes:

receiving an operation instruction of the user, and executing a corresponding operation on the displayed updated three-dimensional image model of the user according to the operation instruction.

An image processing device includes:

a receiving unit, configured to receive image data of a user transmitted by an endoscope, wherein the image data includes at least the image data captured by an imaging unit in the endoscope, and the type of the image data is a depth image;

a processing unit, configured to: store the received image data and respectively judge whether the stored image data can be spliced with each other, and splice the stored image data to obtain spliced image data when splicing is determined; determine the block corresponding to the spliced image data, determine the position of the block in the stored three-dimensional image contour of the user, and reconstruct the spliced image data at the corresponding determined position in the three-dimensional image contour of the user to obtain reconstructed three-dimensional image data, according to the stored three-dimensional image frame database. Wherein the three-dimensional image frame database stores image data of blocks dividing the three-dimensional image frame image and position information of images of each block; and updates the currently stored three-dimensional image model of the user according to the reconstructed three-dimensional image data, wherein the initial value of the three-dimensional image model of the user is the three-dimensional image contour of the user;

a display unit, configured to display the updated three-dimensional image model of the user.

Preferably, the image data of the blocks includes: number information and image characteristic information;

the position information of the image of the blocks comprises: the spatial position relationship between each block;

the image of each block in the three-dimensional image contour is a three-dimensional curved surface shape based on the image of the block in the three-dimensional image frame database or the three-dimensional image model of the user, and comprises a preset image with a single color and a single texture.

Preferably, in view of determining a block corresponding to the spliced image data according to the stored three-dimensional image frame database, and determining the position of the block in the stored three-dimensional image contour of the user, the processing unit is specifically configured to:

respectively match the spliced image data with images of blocks in the three-dimensional image frame database according to a preset image pattern recognition algorithm and based on image characteristic information of blocks in the three-dimensional image frame database, to obtain a first mapping relationship between the spliced image data and blocks in the three-dimensional image frame database; and determine the positions of the blocks in the three-dimensional image frame database corresponding to the spliced image data in the three-dimensional image contour of the user according to the spatial position relationship and/or number information between the blocks.

Preferably, in view of determining a block corresponding to the spliced image data according to the stored three-dimensional image frame database, and determining the position of the block in the stored three-dimensional image contour of the user, the processing unit is specifically configured to:

respectively determine the relative spatial position relationship of the spliced image data according to the relative spatial position relationship of each imaging unit in the endoscope and the identification of the camera units carried in the image data, if the endoscope includes at least two preset camera units with fixed relative positions;

respectively match the spliced image data with the images of the blocks in the three-dimensional image frame database to obtain a first mapping relationship between the spliced image data and the blocks in the three-dimensional image frame database, according to a preset image pattern recognition algorithm and based on the image characteristic information of the blocks in the three-dimensional image frame database and the relative spatial position relationship of the spliced image data; and determine the positions of the blocks in the three-dimensional image frame database corresponding to the spliced image data in the three-dimensional image contour of the user according to the spatial position relationship and/or number information between the blocks.

Preferably, when matching the spliced image data with the images of blocks in the three-dimensional image frame database respectively, the processing unit is further configured to:

obtain the first mapping relationship between the spliced image data and the blocks in the three-dimensional image frame database according to the spatial position relationship between the blocks preset in the three-dimensional image frame database, when it is determined that the spliced image data corresponds to at least two blocks.

Preferably, the processing unit is further configured to:

select a first preset number of first mapping relationships from the at least two groups of first mapping relationships according to the confidence level of each group of first mapping relationships, if at least two groups of first mapping relationships are obtained, and use the selected first preset number of first mapping relationships in calculating the first mapping relationships when the user's image data transmitted by the endoscopic tool is received next time, so that for the next received image data, each mapping relationship based on the selected first preset number of first mapping relationships is respectively obtained until obtaining the maximum number of first mapping relationships not greater than the second preset number, and the superposition confidence of each group of first mapping relationships in the second preset number of first mapping relationships is judged, respectively; and take the first mapping relationships of any one group as the second mapping relationship between spliced image data and blocks in the three-dimensional image frame database, if it is determined that the superposition confidence of any one group of mapping relationships in the second preset number of first mapping relationships is not less than a preset threshold value.

Preferably, in view of reconstructing the spliced image data at a corresponding determined position in the three-dimensional image contour of the user to obtain reconstructed three-dimensional image data, the processing unit is specifically configured to:

extract three-dimensional curved surface images belonging to corresponding blocks from the spliced image data according to boundary characteristic information of blocks in the three-dimensional image frame database, wherein the image characteristic information at least includes boundary characteristic information of a block; and replace the image at the corresponding determined position in the three-dimensional image contour of the user with the extracted three-dimensional curved surface image to obtain reconstructed three-dimensional image data.

Preferably, in view of updating the currently stored three-dimensional image model of the user according to the reconstructed three-dimensional image data, the processing unit is specifically configured to:

replace the image at the corresponding determined position in the currently stored three-dimensional image model of the user with the reconstructed three-dimensional image data;

the processing unit is further configured to:

acquire a three-dimensional image contour corresponding to the updated three-dimensional image model of the user according to the updated three-dimensional image model of the user, and update the stored three-dimensional image contour of the user according to the three-dimensional image contour corresponding to the updated three-dimensional image model of the user.

Preferably, the receiving unit is further configured to: splice the stored image data to obtain spliced image data when it is determined that the spliced image data can be spliced, when the user's image data transmitted by the endoscope is received again the processing unit is further configured to return and execute the stored received image data and respectively judge whether the stored image data can be spliced with each other; determine the position of the spliced image data corresponding to the three-dimensional image contour of the user and reconstruct the spliced image data at the corresponding determined position in the three-dimensional image contour of the user to obtain reconstructed three-dimensional image data, according to the stored three-dimensional image frame database and the stored three-dimensional image contour of the user; and update the currently stored three-dimensional image model of the user according to the reconstructed three-dimensional image data.

Preferably, after displaying the updated three-dimensional image model of the user, the device further includes:

an operation unit, configured to receive an operation instruction from a user and perform corresponding operations on the displayed updated three-dimensional image model of the user according to the operation instruction.

In the embodiment of the invention, receiving image data of a user transmitted by an endoscope; wherein the image data includes at least the image data captured by an imaging unit in the endoscope, and the type of the image data is a depth image; storing the received image data, and respectively judging whether the stored image data can be spliced with each other, and splicing the stored image data to obtain spliced image data when it is determined that the spliced image data can be spliced; determining the position of the spliced image data corresponding to the three-dimensional image contour of the user and reconstructing the spliced image data at the corresponding determined position in the three-dimensional image contour of the user to obtain reconstructed three-dimensional image data, according to the stored three-dimensional image frame database and the stored three-dimensional image contour of the user; updating the currently stored three-dimensional image model of the user according to the reconstructed three-dimensional image data, wherein the initial value of the three-dimensional image model of the user is the three-dimensional image contour of the user; and displaying the updated three-dimensional image model of the user. In this way, according to the established three-dimensional image frame database and the three-dimensional image contour of the user, when the image data is received, the image data are stored and spliced, the spliced image data are processed, reconstructed and other operations are carried out to obtain the reconstructed three-dimensional image, and the currently stored three-dimensional image model of the user is updated in real time, so that the three-dimensional image model of the user is further displayed, continuous and orderly scanning of the oral cavity by the endoscope is not required, and the user can scan the oral cavity at will by using the endoscope. As long as image data of all parts of the inner surface of the oral cavity are obtained regardless of whether the images are ordered or not, the three-dimensional image of the oral cavity can be reconstructed, the reconstruction efficiency of the three-dimensional image is improved. In addition, professional operation is not required, self-service oral cavity endoscopy of the user is well supported, three-dimensional images of the user's oral cavity can be presented, and dynamic display can be performed, so that the display effect is better, the use experience and interaction effect of the user are improved, and self-service three-dimensional true color impression-taking of the user can be well supported.

Moreover, since the embodiment of the invention establishes a three-dimensional image frame database, the three-dimensional image frame database at least includes each block of the pre-divided three-dimensional image frame, and establishes a complete block labeling system. Each block includes: number information, name information, file attribute description information, three-dimensional surface pattern, image characteristic information, and the spatial position relationship between each block. This enables the image processing device of the invention to acquire semantic information of the image data received from the endoscope in the process of processing the received image data. This creates conditions for the application of artificial intelligence technology to carry out oral endoscopic image examination.

DETAILED DESCRIPTION OF THE INVENTION

Hereinafter, the technical scheme in the embodiment of the present invention will be clearly and completely described in conjunction with the drawings in the embodiment of the present invention, and it will be apparent that the described embodiment is only a part of the embodiment of the present invention, and not all of the embodiments. Based on the embodiments of the present invention, all other embodiments obtained by those of ordinary skill in the art without creative labor are within the scope of the present invention.

In order to solve the problems in the prior art that the oral cavity image presents poor user interaction effect and is difficult to support user self-service oral cavity three-dimensional true color scanning, in the embodiment of the invention, a three-dimensional image frame database and a three-dimensional image contour are established, through which the received image data are processed and reconstructed on the three-dimensional image contour of the user, the establishment of the three-dimensional oral cavity image can be realized, and the reconstructed three-dimensional image can be dynamically displayed.

In the following, the scheme of the present invention will be described in detail by specific embodiments. Of course, the present invention is not limited to the following embodiments.

It is worth noting that in the embodiment of the present invention, the reconstruction of the three-dimensional image of the oral cavity is mainly targeted, wherein the endoscope can be an oral endoscope. Of course, in the embodiment of the present invention, it is not limited to the three-dimensional image of the oral cavity, and the reconstruction of the three-dimensional image of other fields can also be applied, and the following description will only take the oral cavity as an example.

Embodiment 1

Figure 1:
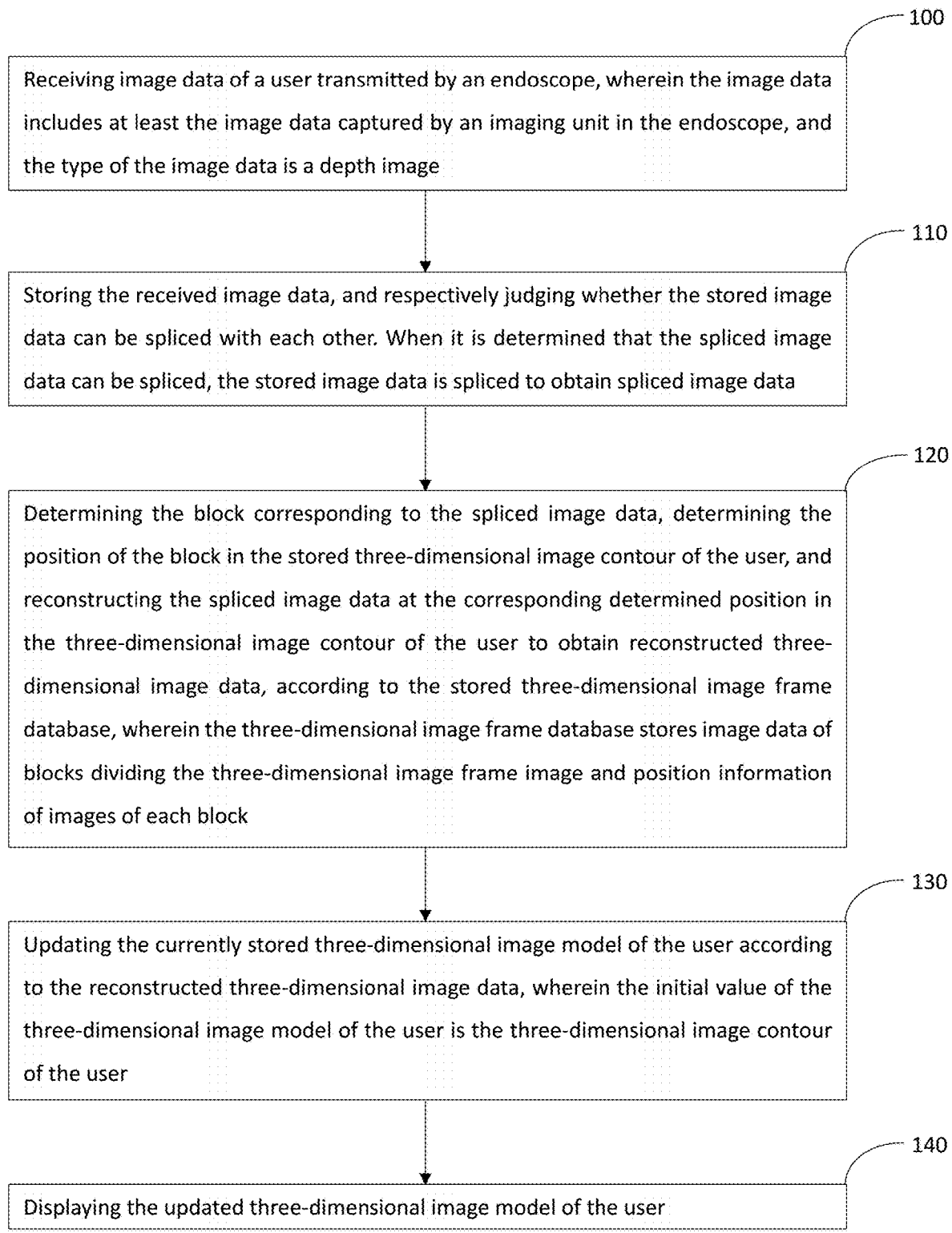
FIG. 1 is a flowchart of a three-dimensional image processing method according to Embodiment 1 of the present invention.

Referring to FIG. 1, in an embodiment of the present invention, the specific flow of the image processing method is as follows:

Step 100: receiving image data of a user transmitted by an endoscope, wherein the image data includes at least the image data captured by an imaging unit in the endoscope, and the type of the image data is a depth image.

In practice, users often have a need to view images of the oral cavity. For example, when having a toothache or a tooth is broken, an image in the oral cavity can be obtained by scanning the oral cavity through an oral endoscope. However, in the prior art, after scanning the oral cavity, only a partial image can be obtained, and the whole three-dimensional image cannot be presented, so that the user cannot view the whole three-dimensional image of the oral cavity, and cannot determine the specific position of the broken tooth or the part with problems in the oral cavity. At present, there is also a technology that can present three-dimensional images of the oral cavity. In the process of reconstructing the three-dimensional images, a unique initial area is set, and then the initial area is taken as the unique anchor point, and image sequences collected at the front end are continuously spliced sequentially, thus continuously expanding the aforementioned area and deriving it into a main body area, which is continuously scanned in the oral cavity until the scanning is completed. However, in this method, if the acquired image data cannot be spliced with the initial area or the main area during the three-dimensional reconstruction process, the image data will be discarded, that is, the user cannot scan the parts he wants to view at will, and the user can only view a three-dimensional image formed by splicing the unique initial area continuously.

In the embodiment of the invention, the received image data is directly reconstructed into the three-dimensional image contour of the user, so that not only the three-dimensional image of the oral cavity can be presented, but also scanning splicing of multiple initial areas can be supported, the user can scan any part in the oral cavity at will, and the specific position of the image in the oral cavity can be seen, so that the user can clearly view the contour and the three-dimensional image of the oral cavity.

The endoscope, for example, an oral endoscope, is provided with a imaging unit for capturing images. The endoscope can be provided with a imaging unit or a plurality of camera units, and the type of the captured image data is a depth image, that is, an RGBD image, which is a three-dimensional true color image, so that the three-dimensional information of the image can be obtained, and the subsequent three-dimensional image reconstruction is convenient.

Step 110: storing the received image data, and respectively judging whether the stored image data can be spliced with each other. When it is determined that the spliced image data can be spliced, the stored image data is spliced to obtain spliced image data.

Wherein, the obtained spliced image data represents all the spliced image data, including not only larger area image data that can be spliced and spliced successfully and formed after being spliced with other image data, but also image data that is still isolated after being judged to be spliced unsuccessfully.

In the embodiment of the invention, each time image data is received, the image data is stored, and whether all currently stored image data can be spliced with each other is determined. That is, not only for the received image data at one time, but also for all currently stored image data, whether splicing can be performed is determined first.

This is because, for the endoscope in the oral cavity, in order to facilitate the user's comfort and convenience, it is generally relatively small, and each imaging unit generally adopts a micro-focal-length imaging unit. For a micro-focal-length imaging unit, the image collected each time is mostly a curved surface with a small area, for example, the area is 2 mm×2 mm or 3 mm×3 mm, which in most cases cannot completely cover a block but only the local surface of a block. Therefore, the image data can be spliced first and then matched, which can improve the matching efficiency and accuracy.

In addition, each received image data will be stored, that is, when judging whether it can be spliced, the stored image data includes not only the received image data this time, but also all the previously received image data. If some of these images can be spliced, splicing and matching can be carried out first, which can also reduce the number of images, reduce the number of matching times between images and blocks, reduce the time and improve the execution efficiency.

Step 120: determining the block corresponding to the spliced image data, determining the position of the block in the stored three-dimensional image contour of the user, and reconstructing the spliced image data at the corresponding determined position in the three-dimensional image contour of the user to obtain reconstructed three-dimensional image data, according to the stored three-dimensional image frame database. Wherein the three-dimensional image frame database stores image data of blocks dividing the three-dimensional image frame image and position information of images of each block.

In the embodiment of the invention, the three-dimensional image frame database and the three-dimensional image contour of the oral cavity are established in advance.

The image data of the block includes number information and image characteristic information.

The position information of the images of the blocks includes a spatial position relationship between each block.

The image characteristic information includes at least parameter information related to the shape, color and texture of the image.

The three-dimensional image contour of the user is obtained based on the three-dimensional image frame database or the three-dimensional image model of the user. Wherein the image of each block in the three-dimensional image contour is a three-dimensional curved surface shape based on the image of the block in the three-dimensional image frame database or the three-dimensional image model of the user, and includes a preset image of a single color and a single texture.

That is, in the embodiment of the invention, a three-dimensional image frame database of the oral cavity and a corresponding three-dimensional image contour are established, the oral cavity is divided into blocks, and various related information is recorded. Thus, technical basis and support are provided for realizing the reconstruction of the three-dimensional image of the oral cavity in the embodiment of the invention. Specifically, the three-dimensional image frame database and the three-dimensional image contour will be described in detail below.

When step 120 is executed, it specifically includes:

Firstly, according to the stored three-dimensional image frame database, the block corresponding to the spliced image data is determined, and the position of the block in the stored three-dimensional image contour of the user is determined.

The specific method of performing this step will be described in detail below.

Then, the spliced image data is reconstructed at a corresponding determined position in the three-dimensional image contour of the user to obtain reconstructed three-dimensional image data.

Specifically:

1) extracting a three-dimensional curved surface image belonging to a corresponding block from the spliced image data according to boundary characteristic information of blocks in the three-dimensional image frame database; wherein the image characteristic information includes at least boundary characteristic information of the block.

In this way, according to the boundary characteristic information of the blocks, the boundary feature of each block can be determined, For example, some spliced image data P(a) corresponds to block 1, but P(a) may cover more information than the block 1. In this case, the corresponding three-dimensional curved surface image can be extracted from P(a) according to the boundary according to the boundary characteristic information of block 1.

For example, for some blocks with a large area, such as the labial mucosa block of maxillary alveolar ridge, the upper boundary of the block is the mucosa reverse fold line of the upper oral vestibular groove, which is connected with the upper labial mucosa block. The lower boundary is connected with the lateral surface of the gingival labial of the upper dentition. The left boundary is connected with the left buccal mucosa block of maxillary alveolar ridge. The right boundary is connected with the right buccal mucosa block of maxillary alveolar ridge.

If the spliced image data obtained in this case is only a part of the block, extraction can also be performed according to each boundary characteristic information of the block. For example, the spliced image data is of the block and contains only the upper boundary characteristic information of the block. For some images from the upper boundary to the middle of the lower boundary, the external image data of the upper boundary can be removed according to the upper boundary characteristic information of the block during extraction, and the image data belonging to the upper boundary of the block and inward of the upper boundary can be retained.

In this case, the three-dimensional curved surface image of the block once extracted from the spliced image data is only a local image of the block. When displaying later, the displayed image of the block is only the local three-dimensional curved surface image that has been extracted from the block. After that, as scanning and image splicing continue, the complete three-dimensional curved surface image of the block can be displayed step by step.

2) replacing the image at the corresponding determined position in the three-dimensional image contour of the user with the extracted three-dimensional curved surface image to obtain reconstructed three-dimensional image data.

wherein, the step of replacing the image at the corresponding determined position in the three-dimensional image contour of the user with the extracted three-dimensional curved surface image can also be divided into the following cases:

The first case includes:

Firstly, according to the first mapping relationship or the second mapping relationship, it is determined that the spliced image data corresponds to the block in the three-dimensional image frame database.

Then, according to the spatial position relationship and/or number information between the blocks, it is respectively judged whether the blocks in the three-dimensional image frame database corresponding to the spliced image data exist in the three-dimensional image contour of the user.

Finally, if yes, the image of the corresponding block in the three-dimensional image contour of the user is directly replaced with the extracted three-dimensional curved surface image.

If not, it is determined the position of the blocks in the three-dimensional image frame database corresponding to the spliced image data according to the spatial position relationship between the blocks, adding corresponding blocks to the positions in the three-dimensional image contour of the user; if other blocks already exist in the position in the three-dimensional image contour of the user, the other blocks is deleted; and the image of the added corresponding block is replaced with the extracted three-dimensional curved surface image.

That is, when reconstructing a three-dimensional image and replacing an image at a corresponding determined position in the three-dimensional image contour of the user, the following operations may be performed on the three-dimensional image contour: replacing the image of the block directly, add or delete the block, and then replace its image. For example, image 1 corresponds to block a in the three-dimensional image frame database, image 2 corresponds to block b in the three-dimensional image frame database, and image 3 corresponds to block c in the three-dimensional image frame database. In addition, block b is adjacent to block a and block c and is between block a and block c, respectively, if block a and block c are adjacent to each other in the three-dimensional image contour of the user which does not include block b, the images of block a and block c in the three-dimensional image contour are directly replaced with image 1 and image 3, block b is added between block a and block c, and the image of block b added in the three-dimensional image contour is replaced with image 2.

Specifically, the following scenario will be further described.

1) Block Deletion

For example, the user's left-lower-4 teeth fall off due to trauma or dental disease. If the user's left-lower-4 teeth fall off, the endoscopic image data shows as follows:

1) the space of the interdental slit on the left side of the distal approximal surface block of the left-lower-3 teeth is relatively large, and the left side of this interdental slit is the mesial approximal surface block of the left-lower-5 teeth.

(2) The area of the gingival papilla block that connects to the left side of the gingival sulcus connected to the left side of the distal approximal surface of the left-lower-3 teeth is relatively large, and the gingival papilla block extends into a mucosal block covered by the top end of the lower alveolar ridge. The left side of the mucous block is connected with the mesial approximal surface of the left-lower-5 teeth through the gingival sulcus.

Therefore, in the process of image reconstruction, the relevant blocks of the left-lower-4 teeth will be removed, which includes: the buccal-side block of the left-lower-4 teeth, the mesial approximal surface block of the left-lower-4 teeth, the distal approximal surface block of the left-lower-4 teeth, the occlusal block of the left-lower-4 teeth, the lingual block of the left-lower-4 teeth and the gingival papilla block of the left-lower-4 teeth, etc. These are the block deletion operations in the image three-dimensional reconstruction process.

2) Block Addition Operation

For example, the lingual side of the user's left-lower-2 teeth has calculus symptoms. If the lingual side of the left-lower-2 teeth of the user has calculus symptoms, the endoscopic image data shows as follows:

1) at least part of the lower boundary of the lingual block of the left-lower-2 teeth of the user is connected with the upper boundary of the calculus block instead of the lingual gum block of the left-lower-2 teeth.

2) the lower boundary of the calculus block is connected with the lingual gum block of the left-lower-2 teeth.

Therefore, in the process of image reconstruction, a calculus block (for example, block number 2412203) will be added between the lingual block of the left-lower-2 teeth and the lingual gum block of the left-lower-2 teeth. The above is the block adding operation in the image three-dimensional reconstruction process.

3) For example, in the three-dimensional image contour of the user, there is an ulcer block in the middle of the oral mucosa block, which has been improved and disappeared. After reconstruction, the image of the oral mucosa block in the three-dimensional image contour is replaced. Since no image of the ulcer block is obtained, the ulcer block in the middle of the oral mucosa block is directly covered by the spliced image data corresponding to the oral mucosa block.

Thus, when updating the three-dimensional image contour of the user and extracting the contour from the updated three-dimensional image model, the contour of the spliced image data of the replaced oral mucosa block is directly extracted for the oral mucosa block, so that the contour of the ulcer block does not exist. In the three-dimensional image contour of the user, the ulcer block is covered and deleted.

The second case includes:

Firstly, according to the first mapping relationship or the second mapping relationship, it is determined that the spliced image data corresponds to the corresponding block in the latest three-dimensional image frame database.

Then, judging whether the spliced image data are adjacent or not, respectively. If yes, it is further determined whether the blocks in the three-dimensional image frame database corresponding to the spliced image data are adjacent in the three-dimensional image contour of the user. If not, each block between blocks corresponding to adjacent spliced image data is deleted in the three-dimensional image contour of the user.

For example, during the previous scanning, the user had calculus symptoms on the lingual side of the left-lower-2 teeth. Later, after tooth washing treatment, the calculus symptoms on the lingual side of the left-lower-2 teeth were removed.

If the user has removed the calculus symptoms on the lingual side of the left-lower-2 teeth after tooth washing treatment, the endoscopic image data shows as follows:

1) the lower boundary of the lingual block of the user's left-lower-2 teeth is connected with the upper boundary of the lingual gum block of the left-lower-2 teeth.

2) there are no other blocks at the position between the lower boundary of the lingual block of the user's left-lower-2 teeth and the upper boundary of the lingual gum block of the left-lower-2 teeth.

Therefore, in the process of image reconstruction, the calculus block (e.g., block number 2412203) between the lingual block of the left-lower-2 teeth and the lingual gum block of the left-lower-2 teeth will be deleted. The above is the block deletion operation in the process of endoscopic image three-dimensional reconstruction.

Thus, in the embodiment of the invention, the three-dimensional image obtained by further adding or deleting blocks can more reflect the real state of the user's oral cavity. For example, there are four connected blocks in the three-dimensional image contour of the user, which are block a, block b, block c and block d in sequence. According to the spliced image data, block b is determined to be deleted, block a and block d are connected through block c, and block a, block c and block d are spliced. During the display, the user will view that block a and block d are connected only by block c, while the original position belonging to block b becomes a spare part, which will directly display transparency, excluding any images.

Of course, it is not limited to the above-mentioned situations, but may also include other situations. For example, the image of a part of a certain block may be replaced, and the embodiment of the present invention is not limited, but the extracted three-dimensional curved surface image may be replaced with the image at the corresponding determined position in the three-dimensional image contour of the user based on the method in the embodiment of the present invention to realize the effect of updating the three-dimensional image contour of the user.

That is to say, in the embodiment of the present invention, the image data transmitted by the endoscope is received, stored and spliced, the spliced image data is identified and matched, mapped to the block, the position of the spliced image data corresponding to the three-dimensional image contour of the user is determined, and then the three-dimensional curved surface image belonging to the corresponding block in the spliced image data can be replaced with the image at the corresponding determined position in the three-dimensional image contour. In this way, whether the actual block in the user's oral cavity is exactly the same as the block in the three-dimensional image contour can be updated to the user's actual oral cavity image.

Further, after replacement, other blocks connected to the block will move outward or inward accordingly, ensuring that the connected blocks are still connected after replacement.

For example, for a block of a tooth in a user's oral cavity, it is possible that the user's tooth is relatively large while the area of the block of the tooth in the three-dimensional image contour is relatively small. In this case, according to the boundary characteristic information of the block, the three-dimensional image curved surface of the block is extracted, and the image of the block of the tooth in the three-dimensional image contour is directly replaced. In the obtained three-dimensional image contour of the user, the block is the same as the block of the tooth actually in the user.

Step 130: updating the currently stored three-dimensional image model of the user according to the reconstructed three-dimensional image data, wherein the initial value of the three-dimensional image model of the user is the three-dimensional image contour of the user.

When step 130 is executed, it specifically includes:

replacing the image at the corresponding determined position in the currently stored three-dimensional image model of the user with the reconstructed three-dimensional image data.

In this way, each time the reconstructed three-dimensional image data is obtained, the images in the corresponding positions in the three-dimensional image model of the user can be continuously replaced to realize the effect of dynamically updating the three-dimensional image model of the user.

Further, the three-dimensional image contour of the user can also be updated, specifically: acquiring a three-dimensional image contour corresponding to the updated three-dimensional image model of the user according to the updated three-dimensional image model of the user, and updating the stored three-dimensional image contour of the user according to the three-dimensional image contour corresponding to the updated three-dimensional image model of the user.

In this way, for different users, there will be corresponding three-dimensional image contours of the user's oral cavity. When scanning the oral cavity later, the actual oral cavity image information of the user can be more easily seen. Moreover, the three-dimensional image model of the user and the three-dimensional image contours of the user can be continuously updated, and the matching efficiency and accuracy can also be improved.

In this way, not only the three-dimensional image contour of the user can be stored, but also the three-dimensional image model of the user can be stored at the same time. According to the updated three-dimensional image model of the user, an oral endoscopic image database for the user can be constructed. In this way, oral conditions of different users can be recorded respectively for different users, which is convenient for follow-up query, for example, oral health conditions of the user can be tracked, oral treatment conditions can be tracked, etc.

Step 140: displaying the updated three-dimensional image model of the user.

Further, when the image data of the user transmitted by the endoscope is received again, the above-mentioned step 110 is returned.

In this way, in the embodiment of the invention, the three-dimensional image contour is displayed to the user at the beginning, and with the continuous reconstruction, the currently stored three-dimensional image model of the user is updated every time the reconstruction is completed, and then the updated three-dimensional image model of the user is displayed. Since the three-dimensional image contour contains a preset image of a single color and a single texture, such as a gray image, and the obtained image data is a three-dimensional true color image, including actual textures of various colors, after updating, the user can view that the three-dimensional image model of the user initially displayed is gradually replaced by the three-dimensional true color image, which can be seen as gradually lighting up the three-dimensional image model, and when scanning is completed, the user can view the three-dimensional true color image including color, texture and other information.

Further, after performing step 140, the method further includes:

receiving an operation instruction of the user, and executing a corresponding operation on the displayed updated three-dimensional image model of the user according to the operation instruction.

For example, the user can enlarge or reduce the three-dimensional image model of the user, and can also rotate the three-dimensional image model of the user so that the user can more clearly view the three-dimensional image model of the user.

In the embodiment of the invention, the three-dimensional image frame database and the three-dimensional image contour are preset, after receiving the user image data transmitted by the endoscope, splicing is carried out, the spliced image data is reconstructed on the corresponding determined position in the three-dimensional image contour of the user, the currently stored three-dimensional image model of the user is updated, and the updated three-dimensional image model of the user is displayed. In this way, in the three-dimensional reconstruction process, as long as the three-dimensional true color image information collected at the front end of the imaging unit can be identified to correspond to which block in the oral cavity, the collected three-dimensional true color curved surface image of the block will be used to replace the default curved surface image at the corresponding position of the block in the original three-dimensional image contour and displayed on the user's terminal without determining a unique initial area before splicing. Therefore, the efficiency of three-dimensional reconstruction can be remarkably improved. In this way, not only can a three-dimensional image of a user's oral cavity be obtained, so that the user can view specific parts of the oral cavity, but also the user can scan any position in the oral cavity at will without continuously scanning from a unique initial area in the oral cavity, thus being convenient for the user to use, improving the use experience of the user, further dynamically displaying the scanned three-dimensional image of the oral cavity, having better presentation effect and being more convenient and flexible.

In addition, the embodiment of the invention establishes a three-dimensional image frame database and a three-dimensional image contour. Before the user performs the scanning operation, the initially displayed three-dimensional image model is a three-dimensional image contour. With the scanning operation of the user in the oral cavity, more image data of the oral cavity can be obtained, and reconstruction and updating can be realized based on the method in the example of the invention. In this way, each block in the three-dimensional image will be gradually replaced by the three-dimensional true color image, while the part that has not been reconstructed and updated still shows the default image on the three-dimensional image contour. Therefore, the user can intuitively sense which parts have not been reconstructed or scanned, and the user can cooperate autonomously to enable the endoscope to roam to the blocks which are still the default images by operating the endoscope. In this way, each imaging unit on the endoscope can acquire more three-dimensional true color images of the oral cavity of the blocks which are still the default images. Finally, the three-dimensional true color image collected by the imaging unit of the endoscope will gradually cover the entire oral cavity inner surface, and the full oral cavity digital endoscopic image will be obtained, which does not need professional operation and can better support the user's self-service oral endoscopic scanning.

Embodiment 2

In step 120 of Embodiment 1, according to the stored three-dimensional image frame database, the block corresponding to the spliced image data is determined, and the position of the block in the stored three-dimensional image contour of the user is determined. The specific implementation method is described below.

Specifically, it determines the block in the user's three-dimensional image frame database corresponding to the spliced image data according to at least image characteristic information of the block in the three-dimensional image frame database, and it determines the position in the three-dimensional image contour of the user corresponding to the spliced image data according to the block in the user's three-dimensional image frame database corresponding to the spliced image data.

Specifically, it can be divided into the following ways:

The first method:

1) respectively matching the spliced image data with the images of the blocks in the three-dimensional image frame database based on the image characteristic information of the blocks in the three-dimensional image frame database according to a preset image pattern recognition algorithm to obtain a first mapping relationship between the spliced image data and the blocks in the three-dimensional image frame database.

In the embodiment of the invention, a three-dimensional image frame database is established for the oral cavity of all users, wherein the images of each block are three-dimensional true color curved surfaces, and image characteristic information thereof can be obtained for subsequent image matching.

Specifically, in the embodiment of the present invention, for example, a block exhaustive matching method can be adopted, that is, the spliced image data can be matched with each block in the three-dimensional image frame database according to the image characteristic information of each block in the three-dimensional image frame database.

For another example, the blocks in the three-dimensional image frame database can be divided according to areas. During matching, it is possible to first determine which area the spliced image data belongs to, and then directly perform matching according to the image characteristic information of the blocks in the corresponding area, so that matching with each block in the three-dimensional image frame database is not required.

2) determining the position of the blocks in the three-dimensional image frame database corresponding to the spliced image data in the three-dimensional image contour of the user according to the spatial position relationship and/or the number information among the blocks.

In this way, according to the first mapping relationship, the block in the three-dimensional image frame database corresponding to the image data can be determined, and then the block in the three-dimensional image frame database and the position in the three-dimensional image contour of the user can be determined, and then the position of the spliced image data in the three-dimensional image contour of the user can be determined.

That is to say, in the embodiment of the present invention, the image collected by the endoscope can be identified and matched, and then the specific position in the oral cavity corresponding to the image can be determined, that is, which one or which blocks in the oral cavity corresponding to the three-dimensional true color image collected by the endoscope can be determined.

The second method:

1) determining the relative spatial position relationship of the spliced image data, respectively, according to the relative spatial position relationship of each imaging unit in the endoscope and the identification of the camera units carried in the image data, if the endoscope includes at least two preset camera units with fixed relative positions.

In the embodiment of the present invention, a plurality of imaging units may also be provided in the endoscope, and the relative positions of the plurality of imaging units in the endoscope are set in advance.

For example, there are 6 imaging units, namely, imaging unit A, imaging unit B, imaging unit C, imaging unit D, imaging unit E and imaging unit F. Wherein, each imaging unit is fixed with a preset relative spatial position relationship that the imaging unit A and the imaging unit B are opposite to each other, and the imaging unit A and the stretching part of the oral endoscope are on the same side. The imaging unit C and the imaging unit D are opposite to each other. The imaging unit E and the imaging unit F are opposite to each other. The connection lines of the camera units A and B and the connection lines of the camera units C and D are perpendicular to each other and in orthogonal relationship. The connection lines of the imaging units A and B and the connection lines of the imaging units E and F are perpendicular to each other and in orthogonal relationship. The connection lines of the imaging units C and D and the connection lines of the imaging units E and F are perpendicular to each other and in orthogonal relationship. The imaging unit C is on the left side, the imaging unit D is on the right side, the imaging unit E is on the upper side, and the imaging unit F is on the lower side when viewed from the imaging unit B side to the side where the imaging unit A (i.e., the stretching part side) is located along the connection line between the camera units A and B.

The endoscope adds an identifier of a corresponding imaging unit to the image data captured by the imaging unit, so that the relative spatial position relationship between the captured image data can be determined according to the relative spatial position relationship of the imaging unit.

2) respectively matching the spliced image data with the images of the blocks in the three-dimensional image frame database based on the image characteristic information of the blocks in the three-dimensional image frame database and the relative spatial position relationship of the spliced image data according to a preset image pattern recognition algorithm to obtain a first mapping relationship between the spliced image data and the blocks in the three-dimensional image frame database.

3) determining the position of the blocks in the three-dimensional image frame database corresponding to the spliced image data in the three-dimensional image contour of the user according to the spatial position relationship and/or the number information among the blocks.

The second method is based on the first method, aiming at the layout scheme that a plurality of camera units are adopted in the endoscope to form a spherical field of view, which can simultaneously receive image data collected by a plurality of camera units at the same time, improve the accuracy and efficiency of image pattern recognition, and also reduce the recognition operation, i.e. the time required to determine the mapping relationship.

For example, after the imaging unit A actually acquires image information P(A) covering both the lingual block of the left-lower-5 second premolar and the lingual block of the left-lower-6 first molar, it is known that the image P(A) covers adjacent lingual block of the premolar and lingual block of the molar according to the preset image pattern recognition algorithm and the image characteristic information of each dental area, and there are four possibilities for obtaining the mapping relationship between the image information P(A) and the area, namely: the lingual block of the left-lower-5 second premolar+the lingual block of the left-lower-6 first molar, the lingual block of the right-lower-5 second premolar+the lingual block of the right-lower-6 first molar, the lingual block of the left-upper-5 second premolar+the lingual block of the left-upper-6 first molar, or the lingual block of the right-upper-5 second premolar+the lingual block of the right-upper-6 first molar.

In addition, during the acquisition of image information P(A), image information P(B), P(C), P(D), P(E), and P(F) are also acquired through images synchronously acquired by other imaging units B, C, D, E, and F.

Base on that relative spatial position relationship between the imaging unit A, the image unit B, the imaging unit C and the imaging unit D, the imaging unit E and the image unit F, if the upper part of the image information P(B) is the soft palate mucosa, the lower part is the lingual surface, the image information P(E) is the hard palate mucosa, and the image information P(F) is the lingual surface, this further confirms that the image information P(A) is a curved surface image of the lingual block, and the oral endoscope is currently located in the user's inherent oral cavity. The image information P(C) includes oral mucosa at the occlusal gap, and the image information P(D) includes lingual curved surface images of other lower teeth. Therefore, it can be determined that the oral endoscope is currently located on the left side of the user's inherent oral cavity, and the image information P(A) covers the curved surface image of the lingual side of the user's left-lower tooth. In summary, it can be judged that the image information P(A) corresponds to the lingual block of the user's left-lower-5 second premolar and the lingual block of the left-lower-6 first molar.

Further, in the second method, the relative spatial position relationship between a plurality of imaging units can be utilized. In this way, after receiving image data captured by a plurality of camera units at the same time, the image data are stored and spliced, and then the spliced image data and the three-dimensional image frame database are matched and identified to respectively correspond to corresponding blocks, and generally are not connected blocks, which is equivalent to constructing a plurality of initial areas simultaneously, and the initial areas are not unique, for example, Q (0, m; m=1, 2, 3, 4, 5, 6).

In this way, the user does not need to continuously scan a certain part in the oral cavity, and any part in the oral cavity can be scanned at will. As the user roams and scans the endoscope in the oral cavity, each imaging unit in the endoscope can acquire more image data. Furthermore, matching and splicing can be continued based on the received more image data, so that the image area of each initial area Q (0, m; M=1, 2, 3, 4, 5, 6) is gradually expanded, and a plurality of initial areas can be spliced in parallel, thereby forming a plurality of derived body areas Q (n, m; M=1, 2, 3, 4, 5, 6) until scanning is completed or a complete three-dimensional image of the oral cavity is generated, which can greatly improve the efficiency of three-dimensional reconstruction.

The third method: based on the first method and the second method, when matching the spliced image data with the images of blocks in the three-dimensional image frame database, respectively, the method further includes:

When it is determined that the spliced image data corresponds to at least two blocks, the first mapping relationship between the spliced image data and the blocks in the three-dimensional image frame database is obtained according to the spatial position relationship between the blocks preset in the three-dimensional image frame database.

That is, the third method can be based on the first method and the second method, and further improve the accuracy and efficiency of identification according to the spatial position relationship between blocks.

In the embodiment of the invention, in the established three-dimensional image frame database, the spatial position relationship between each block is recorded. For example, each block has an adjacency relationship with each other, which includes a front boundary, a back boundary, a left boundary, a right boundary, an upper boundary, a lower boundary, etc. This makes it difficult to determine a block corresponding to an image by image pattern recognition even when an image information sufficient to cover the entire surface of a block is acquired, and the splicing operation can be continued to acquire a larger range of curved surface image information until a plurality of blocks are covered. In this case, the curved surface images of multiple blocks can be used as a whole for pattern recognition according to the adjacent relationship between the multiple blocks, which can remove a lot of uncertainties, improve the accuracy of recognition matching, and shorten the time required for recognition operation.

For example, one piece of image information P(a) covering the lingual block of the left-lower-5 second premolar was acquired. Because the lingual block of the left-lower-4 first premolar and the lingual block of the left-lower-5 second premolar have high similarity, it is difficult to determine the final mapping relationship due to the matching of image features only through image pattern recognition.

As the user roams the oral endoscope in his own oral cavity, the endoscope acquires more image information and returns it back, so that the splicing operation can be continued and the area of the P(a) image is gradually expanded. After the image area of P(a) is expanded to include image information P(b) of both the lingual block of the left-lower-5 second premolar and the lingual block of the left-lower-6 first molar, according to a preset image pattern recognition algorithm and image characteristic information of each dental area, it can be known that adjacent lingual block of the left lower premolar and lingual block of the left lower molar are covered in the image P(b). Since there is a significant difference in the curved surface shape of the lingual block between the molar and the premolar, and the lingual block of the left-lower-4 first premolar has no adjacent relationship with the lingual block of the left-lower-6 molar, it can be determined that the image information P(b) covers the lingual block of the left-lower-5 second premolar and the lingual block of the left-lower-6 first molar, and P(a) corresponds to the lingual block of the left-lower-5 second premolar.

It is worth noting that in the embodiment of the present invention, the first method can be applied to the case where there is only one or more camera units in the endoscope, the second method is applied to the case where there are multiple camera units in the endoscope, and the third method is also applicable to the case where there is only one or more camera units in the endoscope.

The first method is mainly based on image pattern recognition to determine the mapping relationship between the spliced image data and the blocks in the three-dimensional image frame database. In the second method, the relative spatial position relationship of the imaging unit can be further referred to, so that the accuracy and efficiency of determining the mapping relationship between the spliced image data and the blocks can be improved, and the captured data can be more accurately determined to correspond to the specific position in the oral cavity. The third method, based on the first method and the second method, can further refer to the spatial position relationship between blocks, and can also improve the accuracy of determining the mapping relationship between spliced image data and blocks.

Further, based on the above-mentioned first, second and third methods, the method further includes:

If at least two groups of first mapping relationships are obtained, a first preset number of first mapping relationships are selected from the at least two groups of first mapping relationships according to the confidence level of each group of first mapping relationships, and the selected first preset number of first mapping relationships are used in calculating the first mapping relationships when the user's image data transmitted by the endoscopic tool is received next time, so that for the next received image data, respectively obtaining each mapping relationship based on the selected first preset number of first mapping relationships until obtaining the maximum number of first mapping relationships not greater than the second preset number, respectively judging the superposition confidence of each group of first mapping relationships in the second preset number of first mapping relationships. If it is determined that the superposition confidence of any one group of mapping relationships in the second preset number of first mapping relationships is not less than a preset threshold value, the first mapping relationships of any one group are taken as the second mapping relationship between spliced image data and blocks in the three-dimensional image frame database.

The whole process described above can be regarded as a search tree construction process. For example, if the endoscope is provided with eight camera units, image data captured by eight camera units, namely eight RGBD images, can be received each time, with the first preset number being 3 and the second preset number being 1000.

(1) assuming that n (n>1) groups of first mapping relationships are obtained after image data is received for the first time, according to the confidence level, the first three groups of mapping relationships with higher confidence level are selected from the n groups of first mapping relationships, e.g., n (11), n (12) and n (13), respectively, in which case there are three groups.

(2) after receiving the image data for the second time, based on the three mapping relationships of n (11), n (12) and n (13), corresponding n groups of first mapping relationships are respectively obtained, i.e. 1, 2, 3, . . . n groups under n (11); 1, 2, 3, . . . n groups under n (12); 1, 2, 3, . . . n groups under n (13), and the first three groups with higher confidence are respectively selected from each group. They are n (111), n (112), n (113), n (121), n (122), n (123), and n (131), n (132), n (133), and there are $3^2=9$ groups in this case.

(3) after receiving the image data for the third time, based on the nine mapping relationships of n (111), n (112), n (113), n (121), n (122), n (123), and n (131), n (132), n (133), corresponding n groups of first mapping relationships are respectively obtained. That is, there are 1, 2, 3, . . . n groups under n (111); 1, 2, 3, . . . n groups under n (112); 1, 2, 3, . . . n groups under n (113), and so on. Then, the first three groups with higher confidence are selected from each group respectively, namely, n (1111), n (1112), n (1113), n (1121), n (1122), n (1123), . . . , n (1331), n (1332), n (1333), in this case, there are 3^3=27 groups.

(4) by analogy, until the image data is received for the m$^{th}$ time, 3^m groups of mapping relationships can be obtained; if 3^m is not more than the maximum value of 1000, a decision is made, and from the 3^m groups, one group with the highest stacking confidence is selected as the second mapping relationship between the spliced image data and the block, namely the final mapping relationship. Then, based on the second mapping relationship, the spliced image data can be reconstructed at the corresponding determined position on the three-dimensional image contour to obtain the reconstructed three-dimensional image data, and then the three-dimensional image model of the user can be updated and displayed.

For example, step 1: after acquiring one image information P(1) including the local surface of the lingual block of the left-lower-5 second premolar, assuming that the mapping relationship of the acquired P(1) is a tooth surface related area according to the preset image pattern recognition algorithm and the image characteristic information of each area, a plurality of groups of first mapping relationships can be obtained instead of gum surface or lingual surface or various oral mucosa surfaces and other related blocks.

Step 2: after that, as the user roams the oral endoscope in his own oral cavity, more image information is collected and transmitted back, the splicing operation is continued and the area of the P(1) image is gradually expanded. After the area of P(1) is expanded to cover the image information P(2) of the entire lingual block of the left-lower-5 second premolar, according to the preset image pattern recognition algorithm and the image characteristic information of each dental surface area, based on the mapping relationship corresponding to P(1), the mapping relationship of P(2) is obtained to be the lingual block of the premolar, for example, the left-lower-4 first premolar or the left-lower-5 second premolar, or the right-lower-4 first premolar, the right-lower-5 second premolar, the left-upper-4 first premolar, the left-upper-5 second premolar, and the right-upper-4 first premolar.

Step 3: as the user roams the oral endoscope in his own oral cavity, more image data are acquired. After the area of P(2) is expanded to cover the image information P(3) of the lingual block of the second premolar of the left-lower-5 and the lingual block of the first molar of the left-lower-6 at the same time, the lingual block of the adjacent lingual block of the left-lower premolar and lingual block of the left-lower molar can be obtained according to the preset image pattern recognition algorithm and the image characteristic information of each dental area. Because the curved surface shapes of the lingual areas of the molars and premolars are obviously different, and the lingual areas of the left-lower-4 first premolars and the left-lower-6 first molars have no adjacent relationship. Therefore, according to the confidence level, it can be determined that the image information P(3) covers the lingual block of the left-lower-5 second premolar and the lingual block of the left-lower-6 first molar.

In the embodiment of the invention, the imaging interval time of the imaging unit in the endoscope can be set. For example, 20 frames per second, so that multiple shot image data can be obtained in a very short time, and then the time is relatively short when executing the above process, and the subsequent display process will not be affected, the user will not have the perception of pause, and the user's use experience will not be affected.

That is to say, in the embodiment of the present invention, the final mapping relationship may not be obtained every time image data is received, but as more image data is obtained, the mapping relationship with the highest confidence can be determined in sequence, and then image reconstruction and update display can be performed, so that accuracy can be further improved.

Embodiment 3

Based on the above-mentioned embodiments, the three-dimensional image frame database and the three-dimensional image contour will be described in detail below.

1) Three-Dimensional Image Frame Database.

In the embodiment of the invention, the three-dimensional image frame database is constructed based on various conditions of the human oral cavity, and the three-dimensional image frame database stores general frame data of a three-dimensional image model of the human oral cavity, and the frame data covers image characteristic information of all surface areas of the human oral cavity under various conditions, such as information of shape characteristics, color characteristics, texture characteristics and the like. These situations include normal healthy oral cavity scenes, dirty oral cavity scenes, pathological oral cavity scenes, abnormal oral cavity scenes, traumatic oral cavity scenes, mixed tooth scenes in which deciduous teeth grow towards permanent teeth of adults, and normal healthy oral cavity scenes, dirty oral cavity scenes, pathological oral cavity scenes, abnormal oral cavity scenes, traumatic oral cavity scenes, eruption of deciduous teeth scenes of children. With the popularization and use of the method and the device of the invention, the three-dimensional image frame database of the human whole oral cavity inner surface of the invention can be continuously updated and expanded, for example, image characteristic information under new oral cavity pathological scenes or image characteristic information under new oral cavity trauma scenes can be added. In this way, the matching accuracy can be further improved.

The three-dimensional image frame database includes at least each block of the pre-divided three-dimensional image frame. In the embodiment of the invention, the three-dimensional image frame can be directly divided into various blocks when dividing the blocks, of course, when dividing the blocks, the areas can also be divided first, and then each block can be divided in each area, thus the division efficiency is higher, and this is not limited in the embodiment of the invention.

The following is an example of division into areas and blocks. In the embodiment of the invention, the spatial layout of each area and each block is determined according to the actual shape and area of the human oral cavity universal model, and the inner surface of the whole oral cavity is divided into a series of mutually connected areas, and each area is divided into a series of mutually connected blocks.

a. Area

In the embodiment of the invention, the division of areas can be carried out according to the functions of each part in the oral cavity. In addition, each area also has at least one number information.

For example, the inner surface of the oral cavity can be divided into 14 areas, namely: the front wall area of the oral vestibule, the rear wall area of the oral vestibule, the upper oral vestibule groove area, the lower oral vestibule groove area, the left occlusal gap area, the right occlusal gap area, the upper dentition area, the lower dentition area, the upper alveolar ridge bottom area, the lower alveolar ridge top area, the inherent oral upper wall area, the inherent oral bottom wall area, the tongue upper surface area, and the tongue lower surface area.

Each area corresponds to one number information, for example, 1, 2, 3, 4, 5, 6, 7, 8, 9, 10, 11, 12, 13, 14, respectively.

Specifically, the division of areas in the oral cavity is not limited in the embodiment of the present invention, and the purpose is to divide the oral cavity into various distinguishable areas, and each area can be connected to form a complete oral cavity structure.

b. Block

According to the embodiment of the invention, when dividing blocks, the following principles are followed: the interior of a block is single texture and single color as much as possible, and the interior is close to the plane layout as much as possible.

In the embodiment of the invention, the area size and the specific shape of the block are not limited and can be determined by comprehensively considering the accuracy requirements and the calculation amount requirements of the three-dimensional image.

The image data of the block includes number information and image characteristic information.

The position information of the image of the blocks includes the spatial position relationship between each block.

In the embodiment of the invention, the surface connection relationship and the relative spatial position relationship between each block and other blocks are systematically combed and described, each block has its own unique label (e.g., name and number) and relevant image characteristic information, etc., a complete block label system is established, each block can be found quickly, and the image characteristic information of each block can be obtained.

Wherein the label system of the established blocks, each block at least includes: number information, image characteristic information, and the spatial position relationship between each block, and may also include name information, file attribute description information, three-dimensional curved surface pattern, etc.

For example, the rear wall area of the oral vestibule numbered 2 can be divided into 6 blocks, namely: block (2.1), labial mucosa block of maxillary alveolar ridge; block (2.2), left buccal mucosa block of maxillary alveolar ridge; block (2.3), right buccal mucosa block of maxillary alveolar ridge; block (2.4): labial mucosa block of mandibular alveolar ridge; block (2.5), left buccal mucosa block of mandibular alveolar ridge; Block (2.6), right buccal mucosa block of mandibular alveolar ridge.

In this way, a certain block can be indexed according to the number information, and image characteristic information of the block, including boundary characteristic information, etc. can also be known.

Similarly, in the embodiment of the present invention, the division of the blocks in the area is not limited, and can be divided according to the actual situation to ensure that each block can form a complete corresponding area.

That is, in the embodiment of the invention, the constructed three-dimensional image frame database not only divides the oral cavity into areas and blocks, but also establishes a tag system of blocks, which can accurately identify various positions in the oral cavity and is convenient for three-dimensional image matching and reconstruction. Furthermore, this enables the image processing device of the invention to acquire semantic information of the image data received from the endoscope in the process of processing the received image data, thus creating conditions for carrying out oral endoscopic image examination using artificial intelligence technology.

2) Three-Dimensional Image Contour.

In the embodiment of the invention, the three-dimensional image contour stores the shape contour data of the three-dimensional image of each area (including each block) on the inner surface of the whole human oral cavity.

Wherein the three-dimensional image contour of the user at least stores shape contour data of the three-dimensional image of each block in the oral cavity of the user.

The three-dimensional image contour of the user is obtained based on the three-dimensional image frame database or the three-dimensional image model of the user. Wherein the image of each block in the three-dimensional image contour is a three-dimensional curved surface shape based on the image of the block in the three-dimensional image frame database or the three-dimensional image model of the user, and includes a preset image of a single color and a single texture.

That is, in the embodiment of the present invention, the default images of each block of the oral endoscopic panorama are covered in the three-dimensional image contour. The default image of each block in the three-dimensional image contour only includes the three-dimensional curved surface shape of each block, and is in single color+single texture, that is, does not contain the true color and actual texture of each block. For example, the outer surface of the three-dimensional curved surface that sets the default image of each block in the three-dimensional image contour is only dark gray with a smooth texture.

In addition, in the embodiment of the invention, when actually used, the three-dimensional image contour of each user can be updated according to the actual situation of the user, and with the use of different users, there will be a three-dimensional image contour belonging to his own oral cavity of each user.

For example, when a user uses it for the first time, the standard three-dimensional image contour preset according to the user's age information is displayed at the beginning. As the user scans the oral cavity using the oral endoscope and continuously collects the images in the oral cavity, operations such as splicing, identification, reconstruction and the like are carried out based on the image processing method in the embodiment of the invention. As long as the processing of a block is completed, the collected three-dimensional true color curved surface image of the block is used to replace the default curved surface image of the block in the original contour and is displayed on the user terminal.

As the default surface images of one block after another in the three-dimensional image contour are continuously replaced by the acquired three-dimensional true color surface images, and the three-dimensional image model of the user is continuously updated, the oral endoscopic three-dimensional true color surface images displayed on the user terminal are more and more complete, while the default surface images left over from the original three-dimensional image contour are less and less. After the user completes the whole oral endoscopic collection, the panoramic oral endoscopic images displayed on the user terminal are all formed by splicing three-dimensional true color curved surface images.

Furthermore, the three-dimensional image contour can be extracted from the finally displayed three-dimensional true color curved surface image, namely the updated three-dimensional image model of the user, and the standard three-dimensional image contour preset before is updated. When the user uses the oral endoscope again, the three-dimensional image contour updated by the user last time is displayed at the beginning, that is, when all different users use the oral endoscope for the first time, the standard three-dimensional image contour preset according to the age information of the user is displayed. With the use of different users, the three-dimensional image contour is updated, which is related to the user and can represent the actual oral three-dimensional image contour of the user. For different users, the three-dimensional image contour is updated continuously, and the obtained three-dimensional image contour is different.

Embodiment 4

Figure 2:
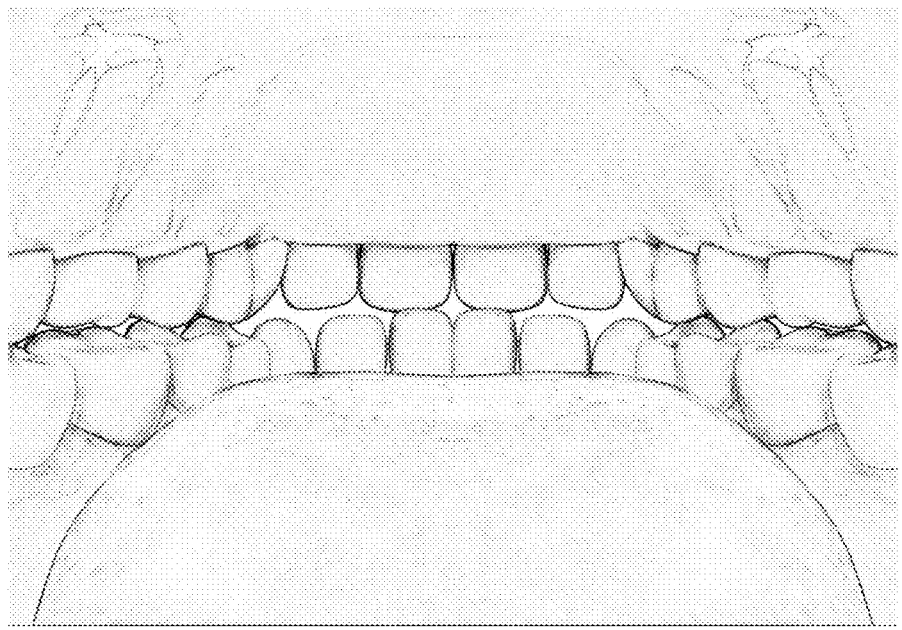
FIG. 2 is an initial display three-dimensional image according to Embodiment 4 of the present invention.

In the following, a specific application scenario will be used to further explain the above embodiments in detail. Referring specifically to FIG. 2, a schematic diagram of the implementation of an image processing method in an embodiment of the present invention is shown.

For example, the endoscope is an oral endoscope, and the oral endoscope uploads the collected oral image to the intelligent terminal, which executes the image processing method in the embodiment of the invention and dynamically displays the three-dimensional image of the oral cavity in the intelligent terminal.

Wherein, the intelligent terminal, for example, a mobile phone, a computer, etc., is not limited in the embodiment of the present invention, but can also perform operations such as matching reconstruction in the cloud and display a three-dimensional image of the oral cavity on the mobile phone side.

First, when the user scans the oral cavity using the oral endoscope and determines that the oral endoscope is connected with the intelligent terminal in communication, as shown in FIG. 2, the three-dimensional image model of the user is initially displayed in the intelligent terminal as a preset three-dimensional image contour. In this case, they are all gray images with single color and single texture.

Figure 3:
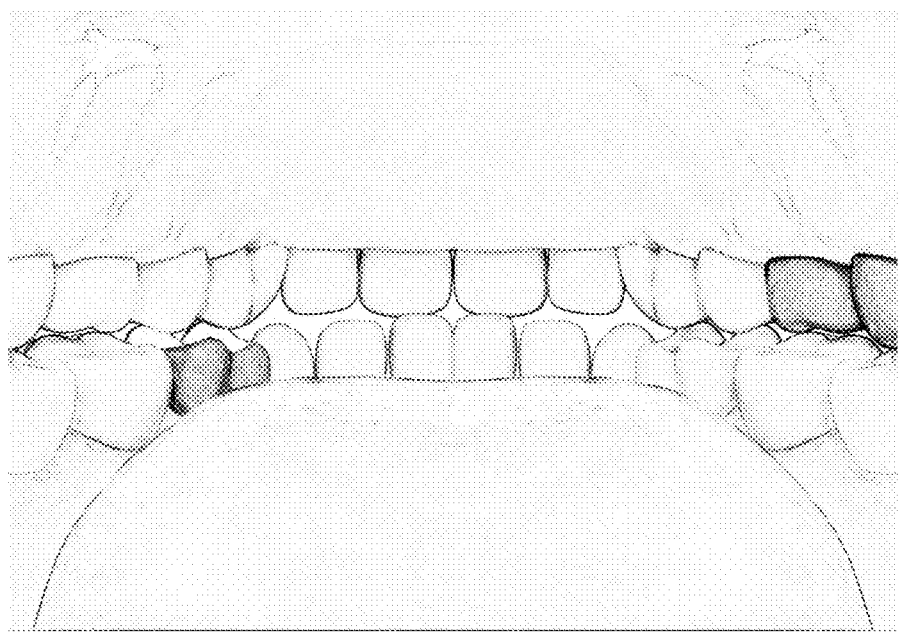
FIG. 3 is a three-dimensional image displayed during scanning according to Embodiment 4 of the present invention.

Then, along with the scanning of the user in the oral cavity, the imaging unit in the oral endoscope will take the three-dimensional true color image in the oral cavity and upload it to the intelligent terminal. Based on the image processing method in the embodiment of the invention, the intelligent terminal reconstructs the received three-dimensional true color image on the corresponding determined position in the three-dimensional image contour of the user, updates the currently stored three-dimensional image model of the user, and further displays the updated three-dimensional image model of the user. For example, referring to FIG. 3, an updated three-dimensional image model of a user is displayed when a part of the three-dimensional image is reconstructed during scanning. As can be seen from FIG. 3, for the upper jaw surface, it retains the original frame and does not light up. For the back of the tongue, it retains the original frame and does not light up. For the lateral area of the jaw of the first and second teeth counted from the right in the upper dentition, it lights up, indicating that scanning has been completed. For the other teeth of the upper dentition, it retains the original frame and does not light up. For the lingual block of the third and fourth teeth from the left in the lower dentition, it lights up, indicating that scanning has been completed. For the other teeth of the lower dentition, it retains the original frame and does not light up. Wherein, it is worth explaining that the lighted part is actually a three-dimensional true color image, and only for distinguishing from the unlit part, darker gray is used for explanation.

In this case, the reconstructed part shows the real three-dimensional color image of the user's real oral cavity, including the actual color, texture and other information, while the unreformed part still shows the gray single color and single texture image preset in the three-dimensional image contour.

Figure 4:
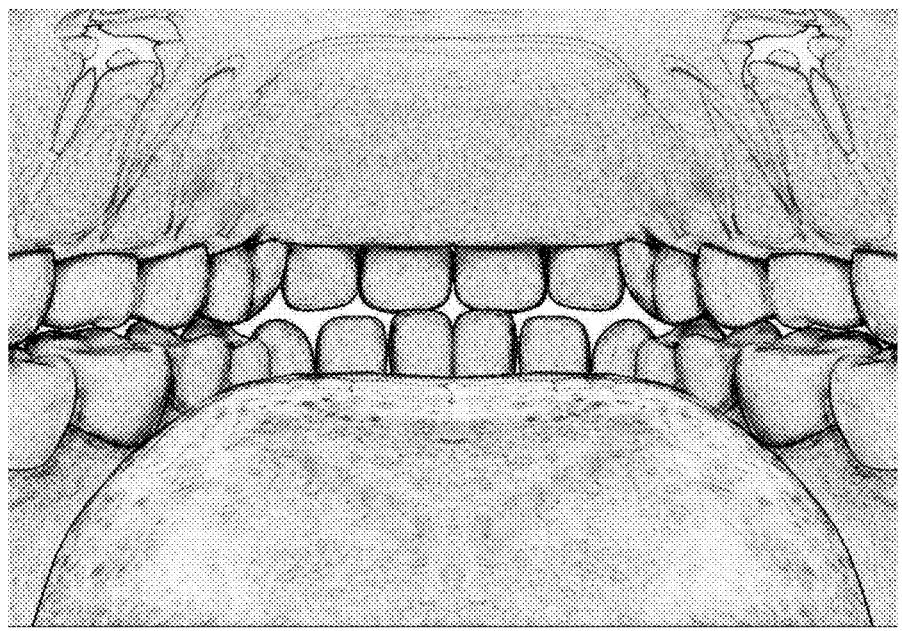
FIG. 4 is a three-dimensional image displayed after scanning according to Embodiment 4 of the present invention.

Finally, when the scanning is completed or all the blocks in the three-dimensional image contour are replaced, the user stops scanning. For example, as shown in FIG. 4, after the scanning is completed, the three-dimensional image model after all the blocks are reconstructed is currently displayed. In this case, a three-dimensional true color image including color, texture and other information is displayed (in FIG. 4, a darker gray color is also used to distinguish the unlit parts). Moreover, the three-dimensional true color image is consistent with the image of the user's oral cavity, which can truly reflect the image and condition of the user's oral cavity.

Embodiment 5

Figure 5:
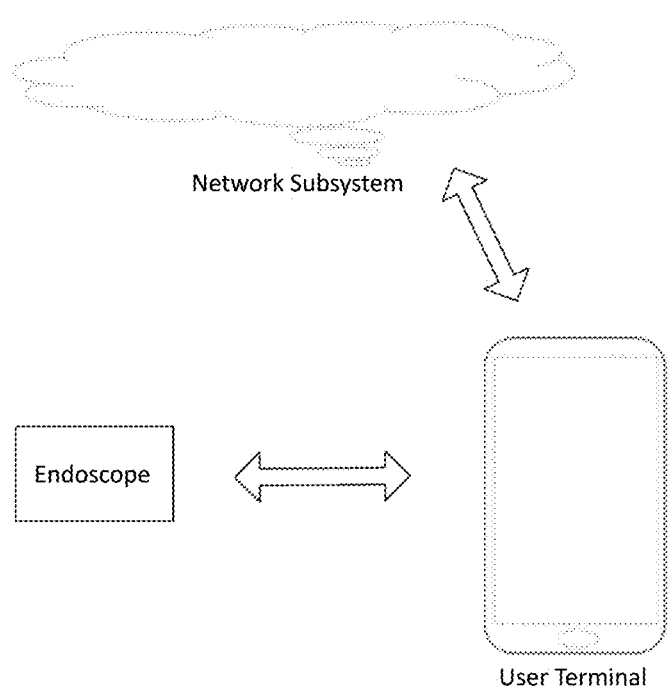
FIG. 5 is a schematic diagram of an environment architecture according to Embodiment 5 of the present invention.

Based on the above embodiment, referring to FIG. 5, an environmental architecture diagram of an application scenario in Embodiment 5 of the present invention is shown.

An application software can be developed to implement the image processing method in the embodiment of the present invention, and the application software can be installed in a user terminal which is respectively connected with an endoscope and a network subsystem to realize communication.

Wherein, the user terminal can be any intelligent device such as a mobile phone, a computer, an iPad, etc. In Embodiment 5 of the present invention, only a mobile phone is described as an example.

For example, a user uses an endoscope to scan the oral cavity and collect images in the oral cavity, the endoscope transmits the collected images to a user terminal, the user terminal acquires a three-dimensional image frame database and a three-dimensional image contour from a server through a network subsystem, and then processes the received image data, stores and splices the image data, determines the position of the spliced image data corresponding to the three-dimensional image contour of the user, and reconstructs the spliced image data on a corresponding determined position in the three-dimensional image contour of the user to obtain the reconstructed three-dimensional image data, further update the currently stored three-dimensional image model of the user, displays, completes oral endoscopic scanning, and obtains the three-dimensional image of the oral cavity of the user.

Embodiment 6

Figure 6:
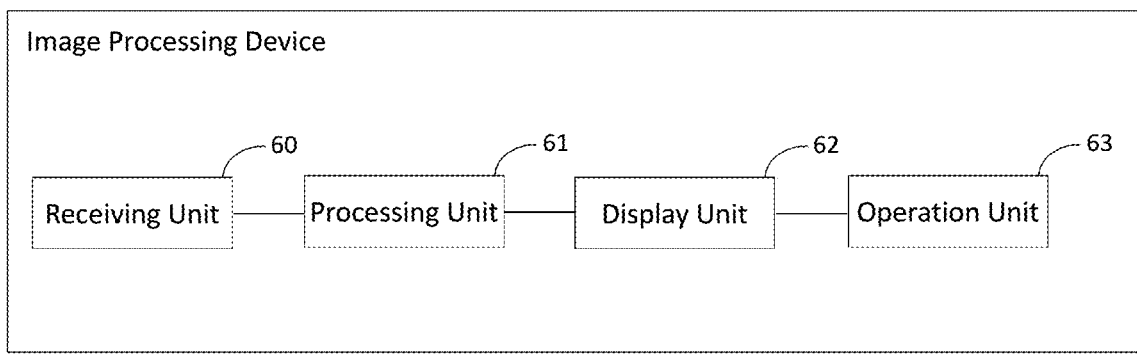
FIG. 6 is a schematic structural diagram of a three-dimensional image processing device according to Embodiment 6 of the present invention.

Based on the above embodiment, referring to FIG. 6, in the embodiment of the present invention, the image processing device specifically includes:

a receiving unit 60, configured to receive image data of a user transmitted by an endoscope, wherein the image data includes at least the image data captured by an imaging unit in the endoscope, and the type of the image data is a depth image;

a processing unit 61, configured to store the received image data and respectively judge whether the stored image data can be spliced with each other. When it is determined that the spliced image data can be spliced, the stored image data is spliced to obtain spliced image data. According to the stored three-dimensional image frame database, the block corresponding to the spliced image data is determined, the position of the block in the stored three-dimensional image contour of the user is determined, the spliced image data is reconstructed at the corresponding determined position in the three-dimensional image contour of the user, and the reconstructed three-dimensional image data is obtained. Wherein the three-dimensional image frame database stores image data of blocks dividing the three-dimensional image frame image and position information of images of each block. In addition, the currently stored three-dimensional image model of the user is updated according to the reconstructed three-dimensional image data. Wherein the initial value of the three-dimensional image model of the user is the three-dimensional image contour of the user.

a display unit 62, configured to display the updated three-dimensional image model of the user.

Preferably, the image data of the blocks includes number information and image characteristic information.

The position information of the image of the blocks includes: the spatial position relationship between each block.

The image of each block in the three-dimensional image contour is a three-dimensional curved surface shape based on the image of the block in the three-dimensional image frame database or the three-dimensional image model of the user, and includes a preset image with a single color and a single texture.

Preferably, according to the stored three-dimensional image frame database, the block corresponding to the spliced image data is determined, and the position of the block in the stored three-dimensional image contour of the user is determined. The processing unit 61 is specifically configured to:

respectively match the spliced image data with images of blocks in the three-dimensional image frame database according to a preset image pattern recognition algorithm and based on image characteristic information of blocks in the three-dimensional image frame database, to obtain a first mapping relationship between the spliced image data and blocks in the three-dimensional image frame database; and determine the positions of the blocks in the three-dimensional image frame database corresponding to the spliced image data in the three-dimensional image contour of the user according to the spatial position relationship and/or number information between the blocks.

Preferably, according to the stored three-dimensional image frame database, the block corresponding to the spliced image data is determined, and the position of the block in the stored three-dimensional image contour of the user is determined. The processing unit 61 is specifically configured to:

respectively determine the relative spatial position relationship of the spliced image data according to the relative spatial position relationship of each imaging unit in the endoscope and the identification of the camera units carried in the image data, if the endoscope includes at least two preset camera units with fixed relative positions;

respectively match the spliced image data with the images of the blocks in the three-dimensional image frame database to obtain a first mapping relationship between the spliced image data and the blocks in the three-dimensional image frame database, according to a preset image pattern recognition algorithm and based on the image characteristic information of the blocks in the three-dimensional image frame database and the relative spatial position relationship of the spliced image data;

determine the positions of the blocks in the three-dimensional image frame database corresponding to the spliced image data in the three-dimensional image contour of the user according to the spatial position relationship and/or number information between the blocks.

Preferably, when the spliced image data is respectively matched with images of blocks in the three-dimensional image frame database, the processing unit 61 is further configured to:

obtain the first mapping relationship between the spliced image data and the blocks in the three-dimensional image frame database according to the spatial position relationship between the blocks preset in the three-dimensional image frame database, when it is determined that the spliced image data corresponds to at least two blocks.

Preferably, the processing unit 61 is further configured to:

select a first preset number of first mapping relationships from the at least two groups of first mapping relationships according to the confidence level of each group of first mapping relationships, if at least two groups of first mapping relationships are obtained, and use the selected first preset number of first mapping relationships in calculating the first mapping relationships when the user's image data transmitted by the endoscopic tool is received next time, so that for the next received image data, each mapping relationship based on the selected first preset number of first mapping relationships is respectively obtained until obtaining the maximum number of first mapping relationships not greater than the second preset number, and the superposition confidence of each group of first mapping relationships in the second preset number of first mapping relationships is judged, respectively; take the first mapping relationships of any one group as the second mapping relationship between spliced image data and blocks in the three-dimensional image frame database, if it is determined that the superposition confidence of any one group of mapping relationships in the second preset number of first mapping relationships is not less than a preset threshold value.

Preferably, the spliced image data is reconstructed at a corresponding determined position in the three-dimensional image contour of the user to obtain reconstructed three-dimensional image data. The processing unit 61 is specifically configured to:

extract three-dimensional curved surface images belonging to corresponding blocks from the spliced image data according to boundary characteristic information of blocks in the three-dimensional image frame database, wherein the image characteristic information at least includes boundary characteristic information of a block; and replace the image at the corresponding determined position in the three-dimensional image contour of the user with the extracted three-dimensional curved surface image to obtain reconstructed three-dimensional image data.

Preferably, according to the reconstructed three-dimensional image data, the currently stored three-dimensional image model of the user is updated. The processing unit 61 is specifically configured to:

replace the image at the corresponding determined position in the currently stored three-dimensional image model of the user with the reconstructed three-dimensional image data.

The processing unit 61 is further configured to:

acquire a three-dimensional image contour corresponding to the updated three-dimensional image model of the user according to the updated three-dimensional image model of the user, and update the stored three-dimensional image contour of the user according to the three-dimensional image contour corresponding to the updated three-dimensional image model of the user.

Preferably, the receiving unit 60 is further configured to: splice the stored image data to obtain spliced image data when it is determined that the spliced image data can be spliced (when the user's image data transmitted by the endoscope is received again, the processing unit 61 is further configured to return and execute the stored received image data, and respectively judge whether the stored image data can be spliced with each other); determine the position of the spliced image data corresponding to the three-dimensional image contour of the user and reconstruct the spliced image data at the corresponding determined position in the three-dimensional image contour of the user to obtain reconstructed three-dimensional image data, according to the stored three-dimensional image frame database and the stored three-dimensional image contour of the user; and update the currently stored three-dimensional image model of the user according to the reconstructed three-dimensional image data.

Preferably, after displaying the updated three-dimensional image model of the user, the device further includes:

an operation unit 63, configured to receive an operation instruction from a user and perform corresponding operations on the displayed updated three-dimensional image model of the user according to the operation instruction.

It should be noted that in the embodiment of the present invention, the above-mentioned receiving unit 60, processing unit 61, display unit 62 and operation unit 63 can all be integrated in one user terminal, for example, all integrated in a mobile phone, of course, they can also be separated. For example, for an endoscope with a handle, the receiving unit 60 and the processing unit 61 can be integrated in the handle of the endoscope, and the display unit 62 and the operation unit 63 can be integrated in the mobile phone. Alternatively, it is possible to integrate part of the functions of the receiving unit 60 and the processing unit 61 into the handle of the endoscope, and other functions of the processing unit 61, the display unit 62 and the operation unit 63 are integrated into the mobile phone in actual implementation, which is not limited in the embodiment of the present invention.

Those skilled in the art will appreciate that embodiments of the present invention may be provided as methods, systems, or computer program products. Therefore, the present invention may take the form of an entirely hardware embodiment, an entirely software embodiment, or an embodiment combining software and hardware aspects. Furthermore, the present invention may take the form of a computer program product implemented on one or more computer usable storage media (including but not limited to magnetic disk memory, CD-ROM, optical memory, etc.) having computer usable program code embodied therein.

The present invention is described with reference to flowcharts and/or block diagrams of methods, device (systems), and computer program products according to embodiments of the present invention. It should be understood that each flow and/or block in the flowchart and/or block diagram, and combinations of flows and/or blocks in the flowchart and/or block diagram, may be implemented by computer program instructions. These computer program instructions may be provided to a processor of a general purpose computer, special purpose computer, embedded processor, or other programmable data processing device to produce a machine, such that the instructions executed by the processor of the computer or other programmable data processing device produce means for implementing the functions specified in the flowchart flow or flows and/or block or blocks of the block diagram.

These computer program instructions may also be stored in a computer-readable memory that can direct a computer or other programmable data processing device to function in a particular manner, such that the instructions stored in the computer-readable memory produce an article of manufacture including instruction means that implement the functions specified in the flowchart flow or flows and/or block or blocks of the block diagram.

These computer program instructions may also be loaded onto a computer or other programmable data processing device such that a series of operational steps are performed on the computer or other programmable device to produce a computer implemented process, such that the instructions that execute on the computer or other programmable device provide steps for implementing the functions specified in the flowchart flow or flows and/or block or blocks of the block diagram.

Although the preferred embodiments of the present invention have been described, those skilled in the art can make additional changes and modifications to these embodiments once they know the basic inventive concepts. Therefore, the appended claims are intended to be interpreted as including the preferred embodiment and all changes and modifications that fall within the scope of the present invention.

Obviously, those skilled in the art can make various changes and modifications to the embodiments of the present invention without departing from the spirit and scope of the embodiments of the present invention. Thus, if these modifications and variations of the embodiments of the present invention fall within the scope of the claims of the present invention and their equivalents, the present invention is also intended to include these modifications and variations.

What is claimed is:

1. An image processing method, characterized in that, comprising the following steps of:

Step A: receiving image data of a user transmitted by an endoscope, wherein the image data at least comprises image data captured by an imaging unit in the endoscope;

Step B: storing the received image data, and respectively judging whether the stored image data can be spliced with each other, and splicing the stored image data to obtain spliced image data when it is determined that the spliced image data can be spliced;

Step C: determining a block corresponding to the spliced image data according to the stored three-dimensional image frame database, and determining the position of the block in the stored three-dimensional image contour of the user, and reconstructing the spliced image data at a corresponding determined position in the three-dimensional image contour of the user to obtain reconstructed three-dimensional image data, wherein the three-dimensional image frame database stores image data of blocks dividing the three-dimensional image frame image and position information of images of each block, Step D: updating the currently stored three-dimensional image model of the user according to the reconstructed three-dimensional image data, wherein the initial value of the three-dimensional image model of the user is the three-dimensional image contour of the user; and Step E: displaying the updated three-dimensional image model of the user.

2. The method according to claim 1, characterized in that, the image data of the blocks comprises: number information and image characteristic information;

the position information of the image of the blocks comprises: the spatial position relationship between each block; and the image of each block in the three-dimensional image contour is a three-dimensional curved surface shape based on the image of the block in the three-dimensional image frame database or the three-dimensional image model of the user, and comprises a preset image with a single color and a single texture.

3. The method according to claim 2, characterized in that, the step of determining a block corresponding to the spliced image data according to the stored three-dimensional image frame database, and determining the position of the block in the stored three-dimensional image contour of the user specifically comprises:

respectively determining the relative spatial position relationship of the spliced image data according to the relative spatial position relationship of each imaging unit in the endoscope and the identification of the camera units carried in the image data, if the endoscope comprises at least two preset camera units with fixed relative positions;

respectively matching the spliced image data with the images of the blocks in the three-dimensional image frame database to obtain a first mapping relationship between the spliced image data and the blocks in the three-dimensional image frame database, according to a preset image pattern recognition algorithm and based on the image characteristic information of the blocks in the three-dimensional image frame database and the relative spatial position relationship of the spliced image data; and determining the positions of the blocks in the three-dimensional image frame database corresponding to the spliced image data in the three-dimensional image contour of the user according to the spatial position relationship and/or number information between the blocks.

4. The method according to claim 2, characterized in that, the step of determining a block corresponding to the spliced image data according to the stored three-dimensional image frame database, and determining the position of the block in the stored three-dimensional image contour of the user specifically comprises:

respectively matching the spliced image data with images of blocks in the three-dimensional image frame database according to a preset image pattern recognition algorithm and based on image characteristic information of blocks in the three-dimensional image frame database, to obtain a first mapping relationship between the spliced image data and blocks in the three-dimensional image frame database; and determining the positions of the blocks in the three-dimensional image frame database corresponding to the spliced image data in the three-dimensional image contour of the user according to the spatial position relationship and/or number information between the blocks.

5. The method according to claim 4, characterized in that, the step of reconstructing the spliced image data at a corresponding determined position in the three-dimensional image contour of the user to obtain reconstructed three-dimensional image data specifically comprises:

extracting three-dimensional curved surface images belonging to corresponding blocks from the spliced image data according to boundary characteristic information of blocks in the three-dimensional image frame database, wherein the image characteristic information at least comprises boundary characteristic information of a block; and replacing the image at the corresponding determined position in the three-dimensional image contour of the user with the extracted three-dimensional curved surface image to obtain reconstructed three-dimensional image data.

6. The method according to claim 4, characterized in that when matching the spliced image data with the images of blocks in the three-dimensional image frame database respectively, the method further comprises:

obtaining the first mapping relationship between the spliced image data and the blocks in the three-dimensional image frame database according to the spatial position relationship between the blocks preset in the three-dimensional image fame database, when it is determined that the spliced image data corresponds to at least two blocks.

7. The method according to claim 6, characterized in that, the method further comprises:

selecting a first preset number of first mapping relationships from the at least two groups of first mapping relationships according to the confidence level of each group of first mapping relationships, if at least two groups of first mapping relationships are obtained, and using the selected first preset number of first mapping relationships in calculating the first mapping relationships when the user's image data transmitted by the endoscopic tool is received next time, so that for the next received image data, each mapping relationship based on the selected first preset number of first mapping relationships is respectively obtained until obtaining the maximum number of first mapping relationships not greater than the second preset number, and the superposition confidence of each group of first mapping relationships in the second preset number of first mapping relationships is judged, respectively; and taking the first mapping relationships of any one group as the second mapping relationship between spliced image data and blocks in the three-dimensional image frame database, if it is determined that the superposition confidence of any one group of mapping relationships in the second preset number of first mapping relationships is not less than a preset threshold value.

8. The method according to claim 1, characterized in that, the step of updating the currently stored three-dimensional image model of the user according to the reconstructed three-dimensional image data specifically comprises:

replacing the image at the corresponding determined position in the currently stored three-dimensional image model of the user with the reconstructed three-dimensional image data;

and the method further comprises:

acquiring a three-dimensional image contour corresponding to the updated three-dimensional image model of the user according to the updated three-dimensional image model of the user, and updating the stored three-dimensional image contour of the user according to the three-dimensional image contour corresponding to the updated three-dimensional image model of the user.

9. The method according to claim 1, characterized in that, the method further comprises:
returning to performing the Step B, when the image data of the user transmitted by the endoscope is received again.

10. The method according to claim 1, characterized in that, after the step of displaying the updated three-dimensional image model of the user, the method further comprises:
receiving an operation instruction of the user, and executing a corresponding operation on the displayed updated three-dimensional image model of the user according to the operation instruction.

11. An image processing device, characterized in that, comprising:
a receiving unit, configured to receive image data of a user transmitted by an endoscope, wherein the image data at least comprises image data captured by an imaging unit in the endoscope;
a processing unit, configured to: store the received image data and respectively judge whether the stored image data can be spliced with each other, and splice the stored image data to obtain spliced image data when splicing is determined; determine the block corresponding to the spliced image data, determine the position of the block in the stored three-dimensional image contour of the user, and reconstruct the spliced image data at the corresponding determined position in the three-dimensional image contour of the user to obtain reconstructed three-dimensional image data, according to the stored three-dimensional image frame database, wherein the three-dimensional image frame database stores image data of blocks dividing the three-dimensional image frame image and position information of images of each block; and updates the currently stored three-dimensional image model of the user according to the reconstructed three-dimensional image data, wherein the initial value of the three-dimensional image model of the user is the three-dimensional image contour of the user; and
a display unit, configured to display the updated three-dimensional image model of the user.

12. The device according to claim 11, characterized in that, the image data of the blocks comprises: number information and image characteristic information;
the position information of the image of the blocks comprises: the spatial position relationship between each block; and
the image of each block in the three-dimensional image contour is a three-dimensional curved surface shape based on the image of the block in the three-dimensional image frame database or the three-dimensional image model of the user, and comprises a preset image with a single color and a single texture.

13. The device according to claim 12, characterized in that, in view of determining a block corresponding to the spliced image data according to the stored three-dimensional image frame database, and determining the position of the block in the stored three-dimensional image contour of the user, the processing unit is specifically configured to:
respectively determine the relative spatial position relationship of the spliced image data according to the relative spatial position relationship of each imaging unit in the endoscope and the identification of the camera units carried in the image data, if the endoscope includes at least two preset camera units with fixed relative positions;
respectively match the spliced image data with the images of the blocks in the three-dimensional image frame database to obtain a first mapping relationship between the spliced image data and the blocks in the three-dimensional image frame database, according to a preset image pattern recognition algorithm and based on the image characteristic information of the blocks in the three-dimensional image frame database and the relative spatial position relationship of the spliced image data; and
determine the positions of the blocks in the three-dimensional image frame database corresponding to the spliced image data in the three-dimensional image contour of the user according to the spatial position relationship and/or number information between the blocks.

14. The device according to claim 12, characterized in that, in view of determining a block corresponding to the spliced image data according to the stored three-dimensional image frame database, and determining the position of the block in the stored three-dimensional image contour of the user, the processing unit is specifically configured to:
respectively match the spliced image data with images of blocks in the three-dimensional image frame database according to a preset image pattern recognition algorithm and based on image characteristic information of blocks in the three-dimensional image frame database, to obtain a first mapping relationship between the spliced image data and blocks in the three-dimensional image frame database; and
determine the positions of the blocks in the three-dimensional image frame database corresponding to the spliced image data in the three-dimensional image contour of the user according to the spatial position relationship and/or number information between the blocks.

15. The device according to claim 14, characterized in that, in view of reconstructing the spliced image data at a corresponding determined position in the three-dimensional image contour of the user to obtain reconstructed three-dimensional image data, the processing unit is specifically configured to:
extract three-dimensional curved surface images belonging to corresponding blocks from the spliced image data according to boundary characteristic information of blocks in the threo-dimensional image frame database, wherein the image characteristic information at least comprises boundary characteristic information of a block; and
replace the image at the corresponding determined position in the three-dimensional image contour of the user with the extracted three-dimensional curved surface image to obtain reconstructed three-dimensional image data.

16. The device according to claim 14, wherein when matching the spliced image data with the images of blocks in the three-dimensional image frame database respectively, the processing unit is further configured to:
obtain the first mapping relationship between the spliced image data and the blocks in the three-dimensional image frame database according to the spatial position relationship between the blocks preset in the three-dimensional image fame database, when it is determined that the spliced image data corresponds to at least two blocks.

17. The device according to claim 16, characterized in that, the processing unit is further configured to:

select a first preset number of first mapping relationships from the at least two groups of first mapping relationships according to the confidence level of each group of first mapping relationships, if at least two groups of first mapping relationships are obtained, and use the selected first preset number of first mapping relationships in calculating the first mapping relationships when the user's image data transmitted by the endoscopic tool is received next time, so that for the next received image data, each mapping relationship based on the selected first preset number of first mapping relationships is respectively obtained until obtaining the maximum number of first mapping relationships not greater than the second preset number, and the superposition confidence of each group of first mapping relationships in the second preset number of first mapping relationships is judged, respectively; and take the first mapping relationships of any one group as the second mapping relationship between spliced image data and blocks in the three-dimensional image frame database, if it is determined that the superposition confidence of any one group of mapping relationships in the second preset number of first mapping relationships is not less than a preset threshold value.

18. The device according to claim 11, characterized in that, in view of updating the currently stored three-dimensional image model of the user according to the reconstructed three-dimensional image data, the processing unit is specifically configured to:

replace the image at the corresponding determined position in the currently stored three-dimensional image model of the user with the reconstructed three-dimensional image data;

and the processing unit is further configured to:

acquire a three-dimensional image contour corresponding to the updated three-dimensional image model of the user according to the updated three-dimensional image model of the user, and update the stored three-dimensional image contour of the user according to the three-dimensional image contour corresponding to the updated three-dimensional image model of the user.

19. The device according to claim 11, characterized in that, the receiving unit is further configured to: splice the stored image data to obtain spliced image data when it is determined that the spliced image data can be spliced, when the users image data transmitted by the endoscope is received again the processing unit is further configured to return and execute the stored received image data and respectively judge whether the stored image data can be spliced with each other, determine the position of the spliced image data corresponding to the three-dimensional image contour of the user and reconstruct the spliced image data at the corresponding determined position in the three-dimensional image contour of the user to obtain reconstructed three-dimensional image data, according to the stored three-dimensional image frame database and the stored three-dimensional image contour of the user; and update the currently stored three-dimensional image model of the user according to the reconstructed three-dimensional image data.

20. The device according to claim 11, characterized in that, after displaying the updated three-dimensional image model of the user, the device further comprises:

an operation unit, configured to receive an operation instruction from a user and perform corresponding operations on the displayed updated three-dimensional image model of the user according to the operation instruction.

* * * * *